United States Patent [19]

Sekiguchi et al.

[11] Patent Number: 5,445,574
[45] Date of Patent: Aug. 29, 1995

[54] MULTIPLE-DISC CLUTCH TYPE ELECTRONICALLY CONTROLLED DIFFERENTIAL LIMITING DEVICE WITH A TORSIONAL DAMPER FOR EACH DRIVER SHAFT

[75] Inventors: Shinichi Sekiguchi, Zama; Hirotaka Kusukawa, Nogaya; Kenichi Tobita, Zama, all of Japan

[73] Assignee: Nissan Motor Co., Ltd., Yokohama, Japan

[21] Appl. No.: 227,823

[22] Filed: Apr. 14, 1994

[30] Foreign Application Priority Data

May 12, 1993 [JP] Japan .................... 5-110394

[51] Int. Cl.⁶ .................................... F16F 15/02
[52] U.S. Cl. .................... 475/346; 475/347; 475/231; 464/89
[58] Field of Search ............... 475/230, 231, 233, 238, 475/346, 347; 464/85, 89, 90, 92

[56] References Cited

U.S. PATENT DOCUMENTS

| 2,785,588 | 3/1957 | Sampietro ............ 475/231 |
| 4,406,640 | 9/1983 | Franklin et al. ............ 464/89 X |
| 4,503,719 | 3/1985 | Hamano ............ 475/347 X |
| 4,799,402 | 1/1989 | Van Dest ............ 475/246 X |

FOREIGN PATENT DOCUMENTS

| 4032378 | 4/1992 | Germany ............ 475/347 |
| 62-103227 | 5/1987 | Japan . |
| 1649168 | 5/1991 | U.S.S.R. ............ 475/347 |

Primary Examiner—Dirk Wright
Assistant Examiner—Khoi Q. Ta
Attorney, Agent, or Firm—Lowe, Price, LeBlanc & Becker

[57] ABSTRACT

A multiple-disc clutch type electronically controlled differential limiting device comprises a differential gear, a hydraulically actuated multiple-disc clutch operably disposed between a differential case and a differential side gear to produce a differential limiting torque by engagement of the clutch, and a differential limiting controller which derives a wheel-speed difference between-right and left driven wheels and hydraulically controls an engaging force of the clutch to increasingly compensate the engaging force in accordance with an increase in the wheel-speed difference. A torsional damper is internally accommodated in the associated drive shaft. A resonance frequency of the torsional damper is set to be equal to a resonance frequency of a torsional vibration system which is constructed by a peripheral member of the differential acting as a mass moment of inertia with respect to the axis of the associated drive shaft and each drive shaft acting as a torsional spring.

5 Claims, 3 Drawing Sheets

MULTIPLE-DISC CLUTCH TYPE ELECTRONICALLY CONTROLLED DIFFERENTIAL LIMITING DEVICE WITH A TORSIONAL DAMPER FOR EACH DRIVER SHAFT

BACKGROUND OF THE INVENTION

1. Field of the Invention

The present invention relates to a differential limiting device with an electronically controlled multiple-disc clutch which variably provides a differential limiting torque by electronically controlling the magnitude of engaging force of the multiple-disc clutch operably arranged between a differential case and a differential side gear.

2. Description of the Prior Art

Recently, there have been proposed and developed various multiple-disc clutch type electronically controlled differential limiting devices, such as a control device for limited slip differentials. One such multiple-disc clutch type electronically controlled differential limiting device has been disclosed in Japanese Patent First Publication No. 62-103227. The prior-art multiple-disc clutch type electronically controlled differential limiting device includes at least one differential gear arranged between wheel axles for distributing an engine output torque into right and left drive shafts respectively connected to right and left driven wheels while permitting a differential action necessary on turns, a hydraulically actuated multiple-disc clutch operably disposed between a differential case and a differential side gear for properly limiting the differential action, an electronically-controlled hydraulic, unit which hydraulically actuates the clutch to increasingly compensate an engaging force of the clutch in accordance with an increase in the speed difference between the right and left driven wheels. For example, during traveling of the vehicle on a split-$\mu$ road wherein one of right and left driven wheels lies on a high-frictional road surface such as a dry pavement and the other driven wheel lies on a low-frictional road surface such as a muddy road, wet or icy roads, the wheel-speed difference tends to increase. The above-noted differential action is rather undesirable in view of running stability of the vehicle during traveling of the vehicle on a split-$\mu$ road. Thus, the conventional differential limiting device is responsive to occurrence of excessive wheel-speed difference to increasingly compensate a clutch engaging force in order to reduce the wheel-speed difference by providing a proper differential limiting torque, and thereby suppresses undesirable differential action. However, there is a tendency judder or shudder of the clutch to occur owing to a clutch friction factor versus wheel-speed difference characteristic, in the event that, during starting of the vehicle on a split-$\mu$ road, the differential limiting device acts to rapidly increase the magnitude of a controlled hydraulic pressure fed to the multiple-disc clutch so that a differential limiting torque is rapidly increased to rigidly interconnect right and left driven wheels and consequently to suppress excessive wheel-speed difference just after starting on the split-$\mu$ road. The above-noted clutch friction factor versus wheel-speed difference characteristic will be hereinafter referred to as a "$\mu$-v characteristic". As is generally known, the multiple-disc clutch has a first series of clutch plates mounted on the differential case and a second series of clutch plates mounted on the differential side gear. The two series of clutch plates are positioned alternately to form a multiple-disc clutch. In case that the flatness of each clutch plate of the multiple-disc clutch is degraded, the coefficient of friction of the clutch is in general lowered in accordance with an increase in the wheel-speed difference between right and left driven wheels, as appreciated from the $\mu$-v characteristic illustrated by the broken line of FIG. 4. Therefore, when the wheel-speed difference v increases during starting of the vehicle on a split-$\mu$ road, the coefficient $\mu$ of friction of the clutch is lowered. In response to excessive increase in the wheel-speed difference, the differential limiting device operates to rapidly increase the differential limiting torque, i.e., the clutch engaging force. In this manner, the excessive wheel-speed difference v is effectively suppressed through one cycle of the differential limiting control. After termination of the differential limiting control, the differential limiting torque, i.e., the clutch engaging force is maintained at a low level owing to less wheel-speed difference. Under this condition, there is a tendency for excessive wheel-speed difference to develop again due to the slipping less-traction wheel and the non-slipping greater-traction wheel on the split-$\mu$ road. In this manner, the wheel-speed difference tends to fluctuate owing to differential limiting controls repeatedly executed during starting of the vehicle on the split-$\mu$ road. Necessarily, the coefficient $\mu$ of friction of the clutch also varies according to fluctuations in the wheel-speed difference. As is well known, the differential limiting torque, that is, the clutch engaging force varies in proportion to the product of the hydraulic pressure applied to the clutch and the friction factor $\mu$ of the clutch. Thus, the fluctuations in the coefficient $\mu$ of friction of the clutch cause the differential limiting torque to fluctuate. As set forth above, the conventional differential limiting device suffers from the drawback that the vehicle experiences shudder of the multiple-disc clutch employed in the differential limiting device owing to fluctuations in the coefficient $\mu$ of friction of the clutch, during starting of the vehicle on a split-$\mu$ road. Such fluctuations in the differential limiting torque act as input vibrations and results in two types of torsional resonance. A first torsional resonance result from a first torsional vibration system which is constructed by a slipping less-traction wheel acting as a mass, and right and left drive shafts cooperatively acting as a torsional spring. An inherent frequency of the first torsional vibration system is determined by two factors, namely a moment of inertia of the mass (slipping less-traction wheel) with respect to the axis of the drive shaft and a spring-rigidity of the respective drive shaft serving as the torsional spring. In the torsional vibration system, the moment of inertia of the mass is also known as a "rotational inertia of the mass". A contact point of a non-slipping greater-traction wheel on the road surface serves as a stationary point of the first vibration system. As appreciated from the above, a relatively long-distance of torsional spring constructed by the two drive shafts is connected in series to the mass constructed by the slipping less-traction wheel. Thus, the first vibration system oscillates at a relatively low resonance frequency such as 7 Hz which test results are experimentally assured by the inventors of the present invention. A second torsional resonance results from a second torsional vibration system which is constructed by a peripheral member of the differential acting as a mass, and a respective drive shaft acting as a torsional spring. In the case that the drive shaft consists of a main drive-shaft portion connected to the corresponding wheel and a flanged drive-shaft inner joint portion splined to a differential side gear, the differential side flange of the inner joint portion has a relatively large rotational inertia. Since the side flange corresponding mainly to the peripheral member of the differential is arranged in the vicinity of the multiple-disc clutch serving as a torsional vibration exciting source, the peripheral member (mass) oscillates at a relatively high resonance frequency such as 150 Hz, as compared with the first torsional vibration system. The former 7 Hz torsional vibration will be hereinbelow referred to as a "7 Hz shudder", while the latter 150 Hz torsional vibration will be hereinbelow referred to as a "150 Hz shudder".

To prevent the above-noted 7 Hz shudder, it is effective to increase rigidities of the respective drive shafts and in addition to reduce a negative gradient of the $\mu$-v characteristic of the multiple-disc clutch. The high-rigidity drive shafts and the reduction of the negative gradient of the $\mu$-v characteristic may effectively contribute to suppress the 7 Hz shudder.

On the other hand, to solve the 150 Hz shudder problem, it is effective to change the $\mu$-v characteristic from minus-gradient tendencies to less-gradient tendencies, that is, to vary the same to a flat $\mu$-v characteristic according to which the coefficient $\mu$ of friction of the clutch is almost constant irrespective of a change in the wheel-speed difference v. In actual, the provision of the flat $\mu$-v characteristic means improvement of clutch-plate materials and enhancement of machining accuracy on the clutch plate surface. To obtain an ultimate flatness of the clutch plate surface, the number of polishing processes of the clutch plate must be necessarily increased. This results in an increase in production costs.

SUMMARY OF THE INVENTION

Accordingly, it is an object of the invention to provide an improved multiple-disc clutch type electronically controlled differential limiting device which avoids the foregoing disadvantages of the prior art.

It is another object of the invention to provide a multiple-disc clutch type electronically controlled differential limiting device which is capable of effectively suppressing shudder of the multiple-disc clutch during starting of the vehicle on a split-$\mu$ road.

In order to accomplish the aforementioned and other objects of the invention, a multiple-disc clutch type electronically controlled differential limiting device, comprises a differential gear arranged between wheel axles for permitting a right driven wheel to turn at a different wheel speed than a left driven wheel while transmitting an output torque of an engine from right and left drive shafts to the axles, a hydraulically actuated multiple-disc clutch operably disposed between a differential case and a differential side gear to produce a differential limiting torque by engagement of the clutch, a pair of wheel speed sensors arranged for monitoring a wheel speed of each driven wheel, and means for deriving a wheel-speed difference between the right and left driven wheels based on the two detected wheel speeds and for hydraulically controlling an engaging force of the clutch to increasingly compensate the engaging force in accordance with an increase in the derived wheel-speed difference, Each drive shaft has a torsional damper. A resonance frequency of the torsional damper is set to be equal to a resonance frequency of a torsional vibration system which is constructed by a peripheral member of the differential gear acting as a mass moment of inertia with respect to an axis of the associated drive shaft and each drive shaft acting as a torsional spring in order to effectively attenuate and damp torsional vibrations of the vibration system. The torsional damper is internally accommodated in the drive shaft.

According to another aspect of the invention, a multiple-disc clutch type electronically controlled differential limiting device, comprises a differential gear arranged between wheel axles for distributing an output torque of an engine into right and left drive shafts respectively associated with right and left driven wheels while permitting a differential action, a hydraulically actuated multiple-disc clutch operably disposed between a differential case and a differential side gear to produce a differential limiting torque by engagement of the clutch, a wheel-speed difference detection means for detecting a wheel-speed difference between the right and left driven wheels, an electronically-controlled hydraulic unit fluidly connected to the clutch and responsive to a control command signal for adjusting an engaging force of the clutch by way of a hydraulic fluid pressure, and a differential limiting controller for outputting the control command signal to the hydraulic unit, for increasingly compensating the engaging force of the clutch in accordance with an increase in the detected wheel-speed difference. Each drive shaft has a torsional damper. A resonance frequency of the torsional damper is set to be equal to a resonance frequency in a torsional vibration system which is constructed by a peripheral member of the differential gear acting as a mass moment of inertia with respect to an axis of the associated drive shaft and each drive shaft acting as a torsional spring. The drive shaft defines therein a hollow section to internally accommodating the torsional damper. The torsional damper comprises an annular body having a preselected mass, a press-fit ring having an outside diameter greater than an inside diameter of the hollow section for an interference fit between an outer periphery of the ring and an inner periphery of the hollow section, and a plurality of elastomeric rubber springs circumferentially arranged between the inner periphery of the ring and an outer periphery of the annular body and equally spaced from each other. Additionally, a moment of inertia of the preselected mass of the annular body with respect to the axis of the associated drive shaft and a spring-rigidity of each rubber spring are designed so that a resonance point of torsional vibration of each torsional damper is equivalent to a resonance frequency of the torsional vibration system.

DESCRIPTION OF THE PREFERRED EMBODIMENTS

Figure 1:
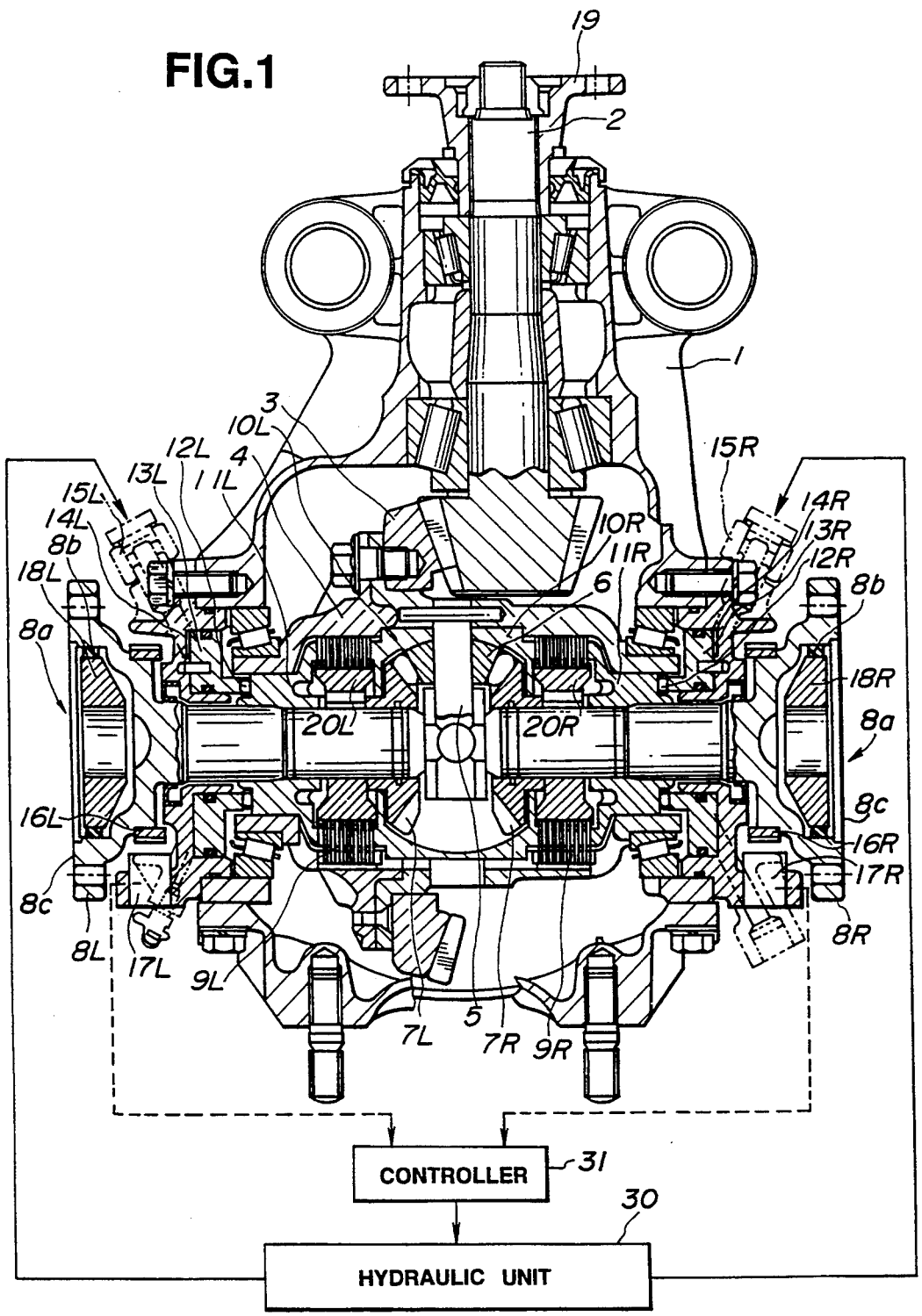
FIG. 1 is a cross-sectional view illustrating an embodiment of a multiple-disc clutch type electronically controlled differential limiting device according to the invention.

Referring now to the drawings, particularly to FIG. 1, the multiple-disc clutch type electronically controlled differential limiting device of the invention is exemplified in case of a differential limiting device for a rear differential gear of a rear-wheel drive vehicle. As seen in FIG. 1, the differential limiting device of the embodiment is assembled to a differential housing 1 of a rear differential of a rear-wheel drive automotive vehicle. The differential housing 1 is firmly secured to the vehicle body by means of stud bolts (not shown). The rear differential also includes a drive pinion 2, a ring gear 3, a differential case 4, a differential pinion mate shaft 5, a differential pinion 6, left and right differential side gears 7L and 7R, left and right differential side flanges 8L and 8R, left and right multiple-disc clutches 9L and 9R, left and right support rings 10L and 10R, left and right push rings 11L and 11R, left and right thrust bearings 12L and 12R, left and right hydraulic pistons 13L and 13R, left and right piston chambers 14L and 14R, left and right oil ports 15L and 15R, a left-driven wheel speed sensor rotor 16L and a right-driven wheel speed sensor rotor 16R, and a left-driven wheel speed sensor 17L and a right-driven wheel speed sensor 17R.

The drive pinion 2 has a drive-pinion flange 19 connected to a propeller shaft which has a driven connection with a transmission output shaft (not shown). The left and right side flanges 8L and 8R are respectively coupled with left and right drive shafts (not shown). The engine power flows from the drive pinion 2 through the ring gear 3, the differential case 4, and the differential pinion shaft 5 to the differential pinion 6, and is delivered via the left and right side gears 7L and 7R to the left and right side flanges 8L and 8R. Each differential side flange is rigidly coupled with the associated drive shaft by means of bolts and nuts. As seen in FIG. 1, the left differential side flange 8L also includes an axially laterally extending drive-shaft inner joint splined to the left differential side gear 7L, while the right differential side flange 8R includes an axially laterally extending drive-shaft inner joint splined to the right differential side gear 7R. As appreciated from the above, the differential side flange is regarded as a portion of the drive shaft. In the embodiment, the right-wheel side drive shaft corresponds to a right main drive-shaft portion and the right side flange 8R corresponds to a right drive-shaft inner joint portion, while the left-wheel side drive shaft corresponds to a left main drive-shaft portion and the left side flange 8L corresponds to a left drive-shaft inner joint portion.. The rear differential gear distributes the engine output torque into the left and right drive shafts respectively connected to left and right driven wheels, while permitting a differential action. The left multiple-disc clutch 9L is provided between the left side gear 7L and the left half of the differential case 4, while the right multiple-disc clutch 9R is provided between the right side gear 7R and the right half of the differential case 4. In a conventional manner, the left multiple-disc clutch 9L has a first series of clutch plates splined to the left half of the differential case 4 and a second series of clutch plates splined to a left clutch hub 20L, while the right multiple-disc clutch 9R has a first series of clutch plates splined to the right half of the differential case 4 and a second series of clutch plates splined to a right clutch hub 20R. The left and right multiple-disc clutches 9L and 9R are arranged in the differential case 4 in such a manner as to effectively limit the differential action of the differential gear. Conventionally, the respective clutches 9L and 9R are applied by way of controlled fluid pressures respectively introduced via the two ports 15L and 15R into the two piston chambers 14L and 14R. As regards the left-half of the differential, the controlled fluid pressure acting on the left piston 13L is transmitted through the left thrust bearing 12L and the left push ring 11L to the multiple-disc clutch 9L, thereby causing the left clutch to be applied. Likewise, as regards the right half of the differential, the controlled fluid pressure acting on the right piston 13R is transmitted through the right thrust bearing 12R and the right push ring 11R to the multiple-disc clutch 9R to engage the right clutch. With the above arrangement, the differential limiting torque or force can be suitably controlled by varying the clutch engaging force, since the differential limiting torque is proportional to the clutch engaging force. The clutch engaging force is generally determined in proportion to the value of the controlled fluid pressure. As seen in FIG. 1, the respective ports 15L and 15R of the differential limiting device are fluidly connected to a hydraulic unit 30 which unit outputs the controlled fluid pressure to the ports 15L and 15R in response to a control command generated from a differential limiting controller 31. The input interface of the differential limiting controller is connected to the two wheel speed sensors 17L and 17R to receive left and right wheel-speed indicative signals therefrom and to derive a wheel-speed difference between the left and right driven wheels. In a conventional manner, the differential limiting controller 31 generates the control command to the hydraulic unit 30, in response to at least the wheel-speed difference. Thus, the engaging force of the respective clutches can be increasingly compensated depending on an increase in the wheel-speed difference. The left and right wheel-speed sensor rotors 16L and 16R are respectively press-fitted into the outer peripherals of the left and right side flanges 8L and 8R, for rotation together therewith. On the other hand, the left and right wheel-speed sensors 17L and 17R are fixed onto the differential housing 1. Each sensor rotor 16L and 16R has a serrated portion on the outer periphery thereof. The serrated portion opposes the associated wheel-speed sensor to cause magnetic flux emitted from the sensor to the serrated portion to vary owing to troughs and ridges of the serrated portion during rotation of the sensor rotor. The variations of magnetic flux are converted to a pulse wave having a frequency directly proportional to the wheel speed of the associated wheel. The wheel-speed sensor further converts the pulse signal to a sinusoidal-wave voltage signal. The controller 31 receives the two sinusoidal-wave voltage signals from the left and right sensors 17L and 17R and determines the wheel-speed difference based on the two signal values. The previously-noted arrangement of the differential limiting device is well-known.

The differential limiting device of the invention also includes left and right torsional dampers 18L and 18R. As clearly shown in FIG. 1, each of the side flanges 8L and 8R has a substantially frusto-conical hollow 8a coaxially arranged with the outer shell of the flange. Each torsional damper 18L and 18R is press-fitted into an inner cylindrical wall surface 8b of the frusto-conical hollow 8a. Under a condition wherein the side flange is assembled to the corresponding drive shaft, the coupling end surface 8c of the side flange is hermetically covered by the end of the drive shaft, with the result that the respective torsional damper is internally hermetically accommodated in the frusto-conical hollow of the side flange. The torsional damper incorporated in the differential limiting device according to the invention will be hereinbelow described in detail.

Figure 2:
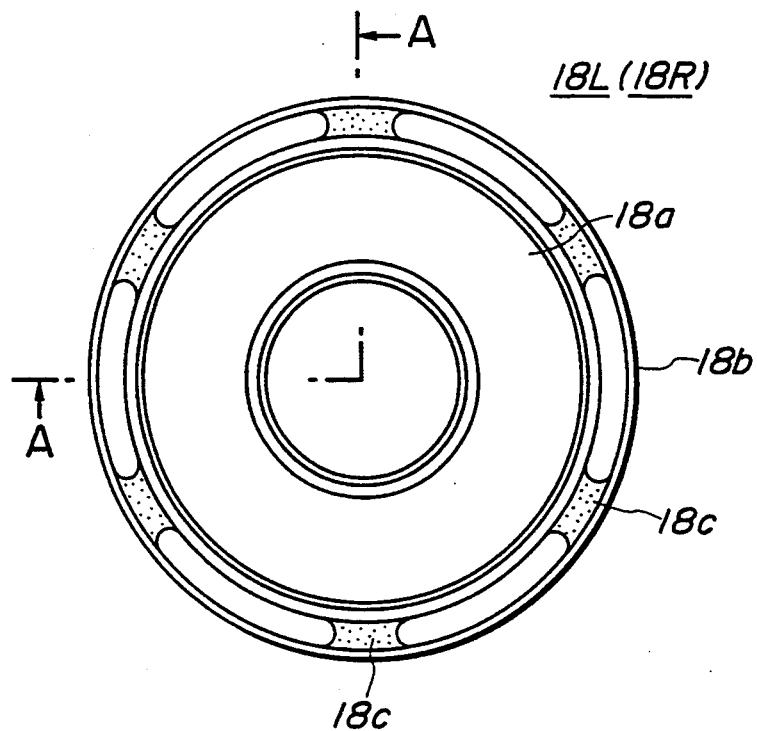
FIG. 2 is a plan view illustrating a torsional damper incorporated in the differential limiting device of the embodiment.
Figure 3:
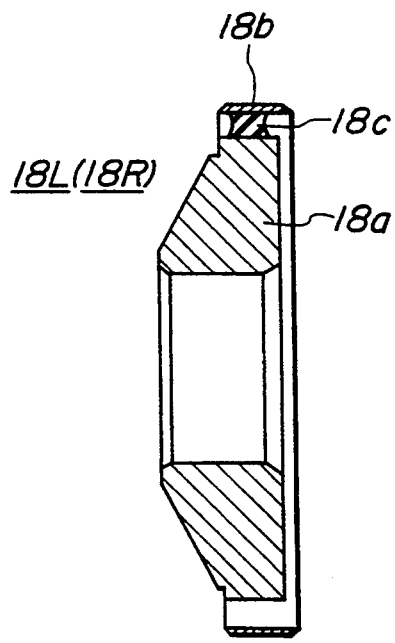
FIG. 3 is a cross-sectional view taken along the line A—A of FIG. 2.

Referring now to FIGS. 2 and 3, each of the torsional dampers 18L and 18R is comprised of a substantially annular frusto-conical body 18a having a preselected moment of inertia of a mass with respect to the axis of the drive shaft, a press-fit ring 18b having an outside diameter greater than the inside diameter of the inner cylindrical wall surface 8b of the frusto-conical hollow 8a for an interference fit between the outer periphery of the ring 18b and the inner periphery of the side flange, and a plurality of elastomeric rubber springs 18c which are circumferentially, equi-distantly arranged between the inner periphery of the press-fit ring 18b and the outer periphery of the annular body 18a. In the embodiment, six rubber springs 18c are provided to resiliently interconnect the outside press-fit ring 18b and the inside annular mass 18a. Note that the rotational inertia of the annular body 18a with respect to the drive shaft and the elasticity or spring-rigidity of the rubber spring 18c are designed so that a resonance point of torsional vibration of each torsional damper 18L and 18R is equivalent to a resonance frequency such as 150 Hz of a torsional vibration system which is constructed by the differential's peripheral member acting as a mass moment of inertia in the torsional vibration system and the respective drive shaft acting as a torsional spring. The differential limiting device with the above-noted torsional dampers operates as follows.

Figure 4:
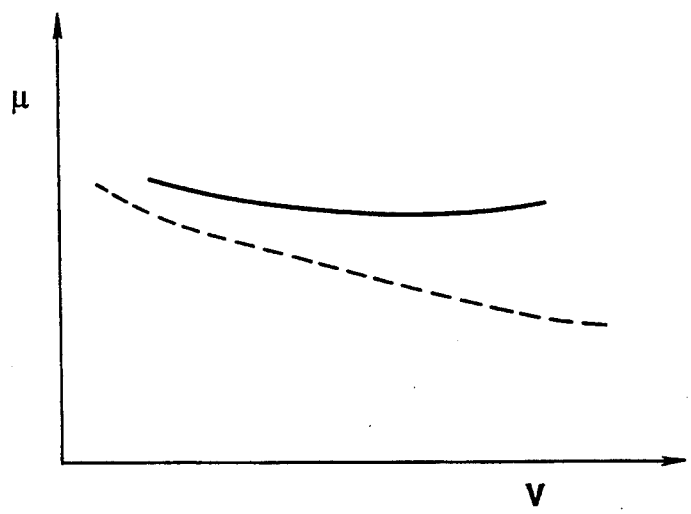
FIG. 4 is a graph illustrating a $\mu$-v characteristic of the multiple-disc clutch of the differential limiting device.

During starting of the vehicle on a split-$\mu$ road, the wheel-speed difference between one driven wheel lying on the high-$\mu$ road and the other driven wheel lying on the low-$\mu$ road becomes excessively large just after starting. In response to the excessively developed wheel-speed difference, the controller 31 the control command to the hydraulic unit 30 to suppress the excessive wheel-speed difference. According to the differential limiting control of the controller, the magnitude of the controlled pressure applied to the respective clutches 9L and 9R is rapidly increased, and thus the result that the differential limiting torque quickly increases. The quick increase in the differential limiting torque causes the left and right driven wheels to rigidly connected to each other. Under such a condition, a relatively low frequency-shudder such as 7 Hz and a relatively high frequency-shudder such as 150 Hz both tend to occur at the clutches 9L and 9R owing to the multiple-disc clutch $\mu$-v characteristic illustrated in the broken line of FIG. 4, as detailed in the Description of the Prior Art. As previously explained, 7 Hz shudder can be effectively prevented by enhancing the rigidity of each drive shaft and by reducing the negative gradient (illustrated by the broken line of FIG. 4) of the $\mu$-v characteristic of each multiple-disc clutch 9L and 9R to one-half (illustrated by the solid line of FIG. 4) of the same. Actually, the improvement of the $\mu$-v characteristic is achieved by enhancing the flatness of the respective multiple-disc clutch. In this manner, 7 Hz shudder can be attenuated to a permissible level by stabilizing the torsional vibration system which system is constructed by the slipping less-traction wheel acting as a mass moment of inertia with respect to the drive shaft, the left and right drive shafts cooperatively acting as a torsional spring, and the contact point of the non-slipping greater-traction wheel acting as a stationary point.

Figure 5:
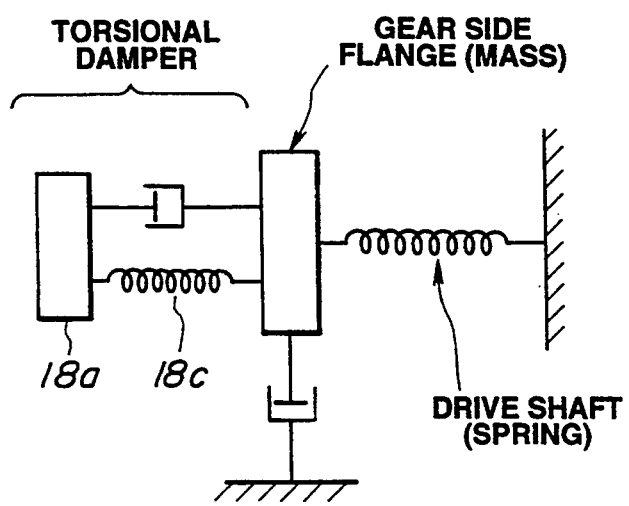
FIG. 5 is an illustration of a vibration model in case of the differential limiting device of the invention which suppresses the 150 Hz shudder occurring during starting of the vehicle on a split-μ road.

On the other hand, in order to attenuate and damp 150 Hz shudder, the above-mentioned torsional dampers 18L and 18R are respectively provided in the left and right side flanges 8L and 8R, so that the annular body 18a oscillates about the axis of the drive shaft or the side flange in reverse phase with respect to the 150 Hz-vibration system which is constructed by the differential peripheral member such as the side flange, the drive-shaft inner joint, the clutch hub, and the push ring all acting as a mass moment of inertia with respect to the axis of the drive shaft and the respective drive shaft acting as a torsional spring. That is, the annular body 18a of the preselected mass serves as a torsional-vibration damping mass. Thus, the amplitude of the 150 Hz torsional vibration is effectively attenuated and reduced. As appreciated from a vibration model illustrated in FIG. 5, the differential limiting device according to the invention includes an additional torsional vibration system which is constructed by the annular body 18a acting as a mass moment of inertia and the rubber spring 18c acting as a torsional spring. The additional torsional vibration system effectively acts to attenuate or absorb the vibrating motion of the other torsional vibration system constructed by the differential peripheral member and the drive shaft. As set forth above, the torsional damper employed in the differential limiting device of the invention can effectively attenuate noise created by the 150 Hz shudder within a permissible noise level, without enhancing the $\mu$-v characteristic of the multiple-disc clutch to the extent of the flat $\mu$-v characteristic according to which the coefficient $\mu$ of friction of the clutch is almost constant irrespective of the magnitude of the wheel-speed difference v.

As explained below, it is advantageous that the torsional damper itself is internally hermetically accommodated in the frusto-conical hollow of the side flange. In the event that the torsional damper is arranged on the outer periphery of the side flange in the vicinity of the wheel-speed sensor rotor, the wheel-speed sensor detects undesirable noise such as 100 Hz to 200 Hz, that is, changes in magnetic flux owing to vibrating motion of the annular mass 18a of the damper, even when the wheel is locked. As appreciated from the detected noise frequency of 100 Hz to 200 Hz approximately equivalent to a resonance frequency (150 Hz) of torsional vibration of the damper, the torsional damper arranged on the outer periphery of the side flange and close to the sensor rotor tends to magnetically interfere with the wheel-speed sensor. This was assured by the inventors of the present invention. Supposing that the differential limiting controller 31 received the noise resulting from the magnetic interference of the damper to the sensor, the differential limiting device would malfunction due to erroneous wheel-speed indicative signal values. Such a wheel-speed data is utilized for an anti-skid brake control (also referred to as a deceleration-slip control) as well as the previously-noted differential limiting control. Supposing that the erroneous wheel-speed data is utilized for the anti-skid brake control, a desirable precise anti-skid brake control cannot be obtained. In such a case, an accuracy of deceleration-slip control may be lowered. As previously noted, since the torsional damper unit is internally accommodated in the frusto-conical hollow of the side flange, the wheel-speed sensor is magnetically insensitive to-the annular mass 18a of the torsional s damper. In the embodiment, the damper unit is internally accommodated in the hollow defined in the differential side flange. Furthermore, the previously-noted installation position of the torsional damper is safe, because damage to the sensor rotor or scattering of fragments of the broken annular mass 18a is avoided, even when the differential limiting device experiences failures of the wheel-speed sensors or the annular mass 18a of the torsional damper owing to damage to the rubber spring. Assuming that the rubber spring was damaged, the vehicle occupants merely would observe a crash of the broken rubber spring.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A multiple-disc clutch type electronically controlled differential limiting device, comprising:
    a differential gear arranged between wheel axles for permitting a right driven wheel to turn at a different wheel speed than a left driven wheel while transmitting an output torque of an engine from right and left drive shafts to the axles;
    a hydraulically actuated multiple-disc clutch operably disposed between a differential case and a differential side gear to produce a differential limiting torque by engagement of the clutch;
    a pair of wheel speed sensors arranged for monitoring a wheel speed of each driven wheel; and
    means for deriving a wheel-speed difference between the right and left driven wheels based on the two detected wheel speeds and for hydraulically controlling an engaging force of said clutch to increasingly compensate said engaging force in accordance with an increase in the derived wheel-speed difference;
    wherein each drive shaft has a torsional damper, a resonance frequency of said torsional damper being set to be equal to a resonance frequency of a torsional vibration system which is constructed by a peripheral member of said differential gear acting as a mass moment of inertia with respect to an axis of the associated drive shaft and each drive shaft acting as a torsional spring.

2. The differential limiting device as set forth in claim 1, wherein said torsional damper is internally accommodated in said drive shaft.

3. A multiple-disc clutch type electronically controlled differential limiting device, comprising:
    a differential gear arranged between wheel axles for distributing an output torque of an engine into right and left drive shafts respectively associated with right and left driven wheels while permitting a differential action;
    a hydraulically actuated multiple-disc clutch operably disposed between a differential case and a differential side gear to produce a differential limiting torque by engagement of said clutch;
    a wheel-speed difference detection means for detecting a wheel-speed difference between the right and left driven wheels;
    an electronically-controlled hydraulic unit fluidly connected to said clutch and responsive to a control command signal for adjusting an engaging force of said clutch by way of a hydraulic fluid pressure; and
    a differential limiting controller for outputting said control command signal to said hydraulic unit, for increasingly compensating the engaging force of said clutch in accordance with an increase in the detected wheel-speed difference;
    wherein each drive shaft has a torsional damper, a resonance frequency of said torsional damper being set to be equal to a resonance frequency in a torsional vibration system which is constructed by a peripheral member of said differential gear acting as a mass moment of inertia with respect to an axis of the associated drive shaft and each drive shaft acting as a torsional spring.

4. The differential limiting device as set forth in claim 3, wherein said torsional damper is internally accommodated in said drive shaft.

5. The differential limiting device as set forth in claim 4, wherein said drive shaft defines therein a hollow section to internally accommodating said torsional damper, said torsional damper comprises an annular body having a preselected mass, a press-fit ring having an outside diameter greater than an inside diameter of said hollow section for an interference fit between an outer periphery of said ring and an inner periphery of said hollow section, and a plurality of elastomeric rubber springs circumferentially arranged between the inner periphery of said ring and an outer periphery of said .annular body and equally spaced from each other, and a moment of inertia of the preselected mass of said annular body with respect to the axis of the associated drive shaft and a spring-rigidity of each rubber spring are designed so that a resonance point of torsional vibration of each torsional damper is equivalent to a resonance frequency of said torsional vibration system.

* * * * *